(12) United States Patent
Yamanouchi

(10) Patent No.: US 9,342,767 B2
(45) Date of Patent: May 17, 2016

(54) IMAGE FORMATION APPARATUS

(71) Applicant: Oki Data Corporation, Tokyo (JP)

(72) Inventor: Katsuyoshi Yamanouchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/608,766

(22) Filed: Jan. 29, 2015

(65) Prior Publication Data

US 2015/0213336 A1 Jul. 30, 2015

(30) Foreign Application Priority Data

Jan. 29, 2014 (JP) ................................. 2014-014467

(51) Int. Cl.
*G06K 15/02* (2006.01)
*G06F 3/12* (2006.01)

(52) U.S. Cl.
CPC ........ *G06K 15/1857* (2013.01); *G06K 15/1848* (2013.01); *G06K 15/186* (2013.01)

(58) Field of Classification Search
None
See application file for complete search history.

(56) References Cited

U.S. PATENT DOCUMENTS

| | | | | |
|---|---|---|---|---|
| 4,284,456 A * | 8/1981 | Hare | ..................... | B44C 1/1712 101/470 |
| 5,231,516 A * | 7/1993 | Kamon | .............. | H04N 1/32358 358/296 |
| 5,798,161 A * | 8/1998 | Kita | ..................... | B41M 5/0256 369/283 |
| 6,317,572 B1 * | 11/2001 | Miyabe et al. | ................ | 399/111 |
| 6,369,843 B1 * | 4/2002 | Springett | ................. | B41J 2/355 347/173 |
| 2002/0121333 A1 * | 9/2002 | Sofer | ................... | B41M 5/0256 156/240 |
| 2003/0141012 A1 * | 7/2003 | Ketterer | ................ | B44D 2/002 156/230 |
| 2005/0100689 A1 * | 5/2005 | He | .......................... | B32B 27/00 428/32.79 |
| 2008/0158270 A1 * | 7/2008 | Ishibashi | .......................... | 347/7 |
| 2008/0305288 A1 * | 12/2008 | Dalvey | ................ | B41M 5/0256 428/32.69 |
| 2009/0043417 A1 * | 2/2009 | Yamada | ....................... | 700/138 |
| 2011/0111185 A1 * | 5/2011 | Banks | ........................ | 428/195.1 |
| 2013/0070264 A1 * | 3/2013 | Ishiyama | ...................... | 358/1.9 |
| 2013/0078001 A1 | 3/2013 | Koido | | |
| 2014/0335318 A1 * | 11/2014 | Epling | ..................... | B44C 1/17 428/172 |

FOREIGN PATENT DOCUMENTS

| | | |
|---|---|---|
| CN | 103019064 A | 4/2013 |
| EP | 2573624 A2 | 3/2013 |
| JP | 2013-068811 A | 4/2013 |

* cited by examiner

*Primary Examiner* — Beniyam Menberu
(74) *Attorney, Agent, or Firm* — Mots Law, PLLC

(57) ABSTRACT

An image formation apparatus including: a first image data creation unit configured to create image data of a main image to be formed on the front side of a first medium; a second image data creation unit configured to create image data of a sub-image to be formed on the back side of the first medium; and an engine unit configured to form the main image on the front side of the first medium on the basis of the image data of the main image, and the sub-image on the back side of the first medium on the basis of the image data of the sub-image. A position indication part that indicates a position of the main image on the front side of the first medium is formed on the sub-image.

18 Claims, 12 Drawing Sheets

IMAGE FORMATION APPARATUS

CROSS REFERENCE TO RELATED APPLICATIONS

This application claims priority based on 35 USC 119 from prior Japanese Patent Application No. 2014-014467 filed on Jan. 29, 2014, entitled "IMAGE FORMATION APPARATUS", the entire contents of which are incorporated herein by reference.

BACKGROUND OF THE INVENTION

1. Field of the Invention

The disclosure relates to an image formation apparatus.

2. Description of Related Art

As a conventional image formation apparatus for printers, copiers, facsimile machines, and multifunction machines and the like, a conventional printer, for example, includes photosensitive drums, charge rollers, LED heads, development units, transfer units, a fuser, and the like, and is configured to form an image by image formation processing.

One type of conventional printer has been provided that is capable of forming an image for thermal transfer. This printer uses iron-on transfer paper, for example, as a first medium, and forms a thermal transfer image by: forming a toner image as a developer image on the iron-on transfer paper; coating the toner image with a coating agent of a predetermined color, for example, white toner to form a white toner-coated image; and then fixing the white toner coated-image.

In the case of the aforementioned printer, the iron-on transfer paper on which the thermal transfer image is fixed is turned over and placed on a cloth as a second medium, and the thermal transfer image is thermally transferred onto the cloth by using an iron to form a predetermined image on the cloth (for example, see Japanese Patent Application Publication No. 2013-68811).

SUMMARY OF THE INVENTION

However, in the case of the conventional printer, the toner image is coated and is hidden by the white toner. Without viewing the image, an operator cannot know which position and direction to place the iron-on transfer paper on the cloth when placing the turned-over iron-on transfer paper on the cloth.

Consequently, the thermal transfer image cannot be thermally transferred onto the cloth with high accuracy, and the image cannot be adequately formed on the cloth.

An objective of one embodiment according to the invention is to provide an image formation apparatus capable of transferring a thermal transfer image formed on a first medium onto a second medium with high accuracy, and adequately forming the image on the second medium.

An aspect of the invention is an image formation apparatus for forming an image on a first side and a second side of a first medium, the image formation apparatus including: a first image data creation unit configured to create image data of a main image to be formed on the first side of the first medium; a second image data creation unit configured to create image data of a sub-image to be formed on the second side of the first medium; and an engine unit configured to form the main image on the first side of the first medium on the basis of the image data of the main image, and the sub-image on the second side of the first medium on the basis of the image data of the sub-image. The sub-image includes a position indication part that indicates a position of the main image on the first side of the first medium.

According to this aspect of the invention, the main image is formed on the first side of the first medium on the basis of the image data of the main image, the sub-image is formed on the second side of the first medium on the basis of the image data of the sub-image, and the position indication part that indicates a position of the main image on the first side of the first medium is formed on the sub-image. Therefore, when placing the first medium on the second medium, the operator can know which position and direction to place the first medium on the second medium.

Consequently, the main image can be transferred onto the second medium with high accuracy, and the image can be adequately formed on the second medium.

DETAILED DESCRIPTION OF EMBODIMENTS

Figure 1:
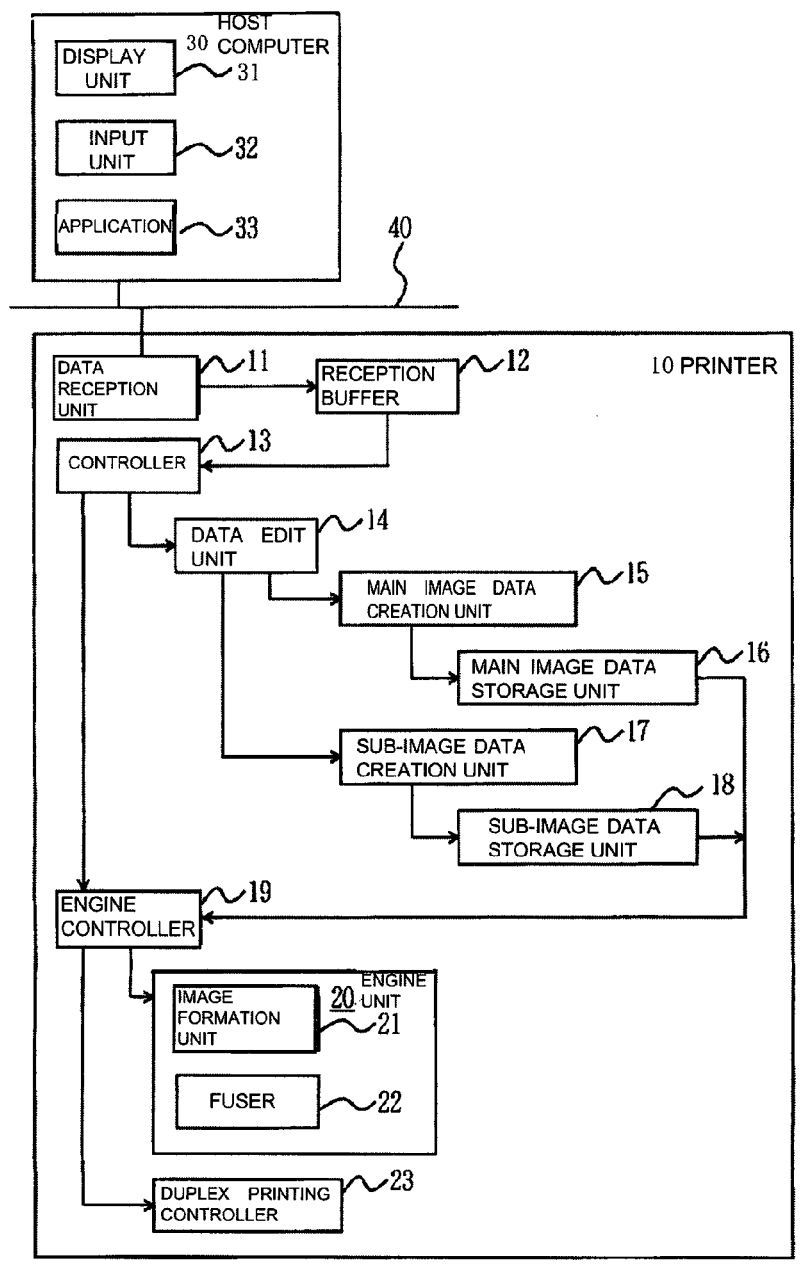
FIG. 1 is a control block diagram of a printing system according to a first embodiment of the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Hereinafter, embodiments of the invention are described in details with reference to the drawings. In this case, a printer as an image formation apparatus is described.

Figure 2:
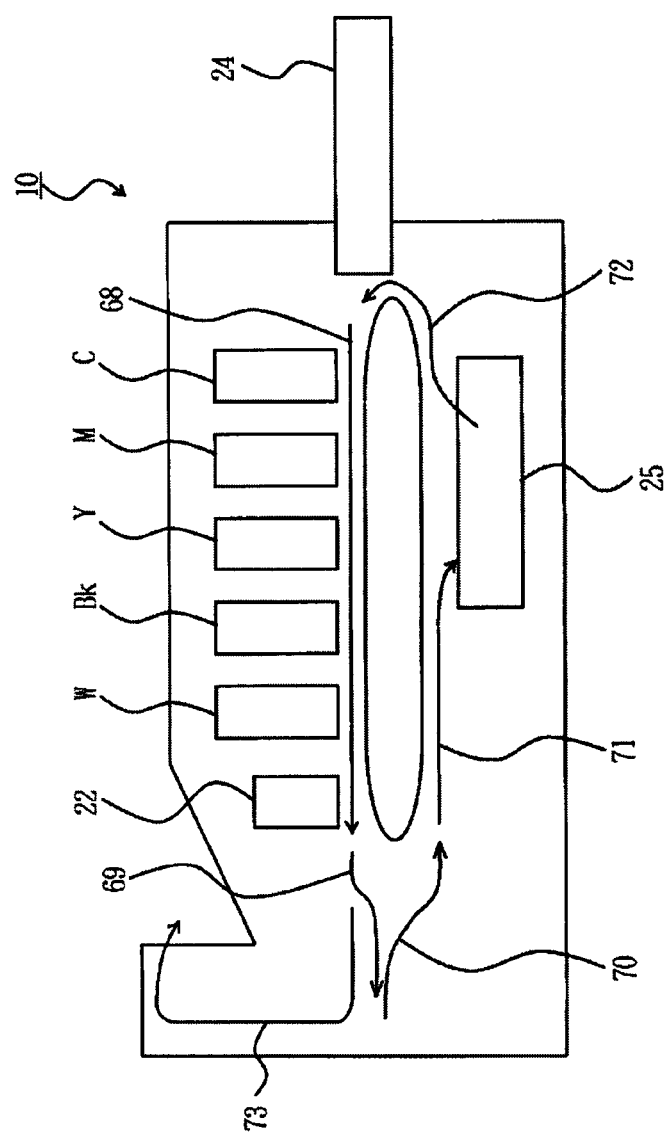
FIG. 2 is a conceptual diagram of a printer in the first embodiment of the invention.

FIG. 2 is a conceptual diagram of a printer according to a first embodiment of the invention.

In FIG. 2, 10 denotes a printer; 24 denotes a paper cassette as a first medium holder that holds therein iron-on transfer paper, which is not illustrated, as a first medium and as a transfer medium; 25 denotes a reverse paper stack as a second medium holder that holds therein the iron-on transfer paper of which both sides are reversed; C, M, Y, and Bk respectively denote image formation units that are disposed along conveyance path 68 of the iron-on transfer paper and, form, with toner as developers of cyan, magenta, yellow and black colors, toner images as developer images of the respective colors; and W denotes an image formation unit that is disposed adjacent to image formation unit Bk, and uses a coating agent of a predetermined color, namely toner as a white developer in the embodiment, to form a toner image as a white developer image.

In this case, printer 10 can form images on a front side as a first surface and a back side as a second surface, of the iron-on transfer paper. In other words, on the basis of print data received from a host computer as a higher-level apparatus, which is not illustrated, printer 10 forms a predetermined color toner image on the front side of the iron-on transfer paper, and forms a white toner image over the predetermined color toner image, thereby forming a white toner coated image as a coating-agent coated image. Printer 10 fixes the white toner coated image, thereby forming a thermal transfer image coated with white toner, in other words, a first color image (hereinafter, referred to as "main image") on the front side of the iron-on transfer paper. It should be noted that the main image is formed to be peelable from the iron-on transfer paper.

Moreover, printer 10 forms a different predetermined color toner image on the back side of the iron-on transfer paper with the main image formed on the front side, and fixes the different predetermined color toner image, thereby forming a second color image (hereinafter, referred to as "sub-image") on the back side of the iron-on transfer paper.

For the formation, each of image formation units C, M, Y, Bk, and W includes: a photosensitive drum as an image carrier; a charge roller as a charge device that equally charges a front side of the photosensitive drum; a development roller as a developer carrier that adheres toner on the photosensitive drum on which an electrostatic latent image as a latent image is formed, thereby forming a toner image; a toner supply roller as a developer supply member that supplies toner to the development roller; and the like, any of which are not illustrated herein.

Further, LED heads as exposure devices are disposed so as to be opposed to the photosensitive drums of respective image formation units C, M, Y, Bk, and W. The LED head exposures light to a charged surface of a photosensitive drum on the basis of image data sent from controller 13 (FIG. 1), which is described later, thereby forming the electrostatic latent image.

Moreover, transfer units, which are not illustrated, are disposed below image formation units C, M, Y, Bk, and W, and transfer rollers, as transfer members of the transfer units, are disposed so as to be opposed to the respective photosensitive drums.

The respective transfer rollers opposed to the photosensitive drums of image formation units C, M, Y, and Bk successively transfer toner images of the respective colors by overlaying the toner images one on another onto the front side of the iron-on transfer paper. The iron-on transfer paper is supplied from reverse paper stack 25 and is conveyed through conveyance path 72 and conveyance path 68, thereby forming the predetermined color toner image. The transfer rollers also successively transfer toner images of the respective colors by overlaying the toner images one on another onto the back side of the iron-on transfer paper that is supplied from paper cassette 24 and conveyed through conveyance path 68, thereby forming the different predetermined color toner image on the back side of the iron-on transfer paper. Further, the transfer roller opposed to the photosensitive drum of image formation unit W forms a white toner image over the predetermined color toner image formed on the front side of the iron-on transfer paper, thereby forming the white toner coated image.

Fuser 22 as a fixation device is disposed at a downstream side from image formation unit W in conveyance path 68. Fuser 22 fixes the white toner coated image formed on the front side of the iron-on transfer paper to form the main image on the front side of the iron-on transfer paper. Moreover, fuser 22 fixes the different predetermined color toner image formed on the back side of the iron-on transfer paper to form the sub-image on the back side of the iron-on transfer paper.

Moreover, conveyance paths 69 and 70 are formed that reverse the iron-on transfer paper with the toner image of the different predetermined color on the back side, and conveyance path 71 is formed that sends the reversed iron-on transfer paper to reverse paper stack 25. It should be noted that conveyance paths 69 and 70 constitute a reverse mechanism for the iron-on transfer paper.

Further, conveyance path 73 is formed at a downstream side from fuser 22. The iron-on transfer paper with the main image and the sub-image formed on the front side and on the back side, respectively, is discharged through conveyance path 73, to the outside of the main body of printer 10, or in other words, to the outside of the main body of the apparatus.

It should be noted that the white toner forms a shield layer that hides the main image to disable the main image to be viewed through the iron-on transfer paper from the back side, and has a function as an adhesive agent to bond the main image to cloth as a second medium, i.e., a T-shirt in the embodiment.

Next, a printing system including printer 10 and the host computer is described.

FIG. 1 is a control block diagram of a printing system in the first embodiment of the invention.

In FIG. 1, 10 denotes a printer and 30 denotes a host computer. Printer 10 and host computer 30 are connected via communication line 40, and constitute the printing system.

Host computer 30 is provided with display unit 31, input unit 32, and application 33 as a higher-level controller. Application 33 forms a predetermined screen in display unit 31, creates print data on the basis of inputted information when an operator operates input unit 32 to input predetermined information on the screen, and transmits the print data to printer 10.

Printer 10 is provided with: data reception unit 11 that receives print data transmitted from host computer 30; reception buffer 12 that temporarily records the received print data; controller 13 that performs overall control of printer 10; data edit unit 14 that reads out and edits the print data recorded in the reception buffer 12; main image data creation unit 15 as a first image data creation unit that creates first image data to form a main image on the basis of an instruction of data edit unit 14; main image data storage unit 16 as a first image data storage unit that records the first image data; sub-image data creation unit 17 as a second image data creation unit that creates second image data to form a sub-image; sub-image data storage unit 18 as a second image data storage unit that records the second image data; and the like. Moreover, printer 10 is provided with: a power supply device, which is not illustrated, that applies voltages to motors, which are not illustrated, as drive units disposed in printer 10; the photosensitive drums in image formation units C, M, Y, Bk, and W; the respective rollers such as the charge rollers, the development rollers, the toner supply rollers and the transfer rollers; engine controller 19 that controls the respective elements such as fuser 22; engine unit 20; and duplex printing controller 23 that reverses the iron-on transfer paper. Further, engine unit 20 is provided with image formation unit 21 that includes the image formation units C, M, Y, Bk, and W, the LED heads, the transfer units, and the like, and fuser 22.

Next, an operation of host computer 30 is described.

Figure 3:
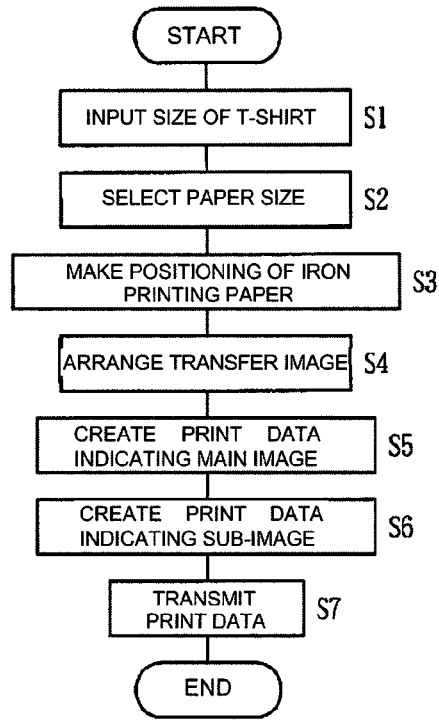
FIG. 3 is a flowchart illustrating an operation of an application in the first embodiment of the invention.
Figure 4:
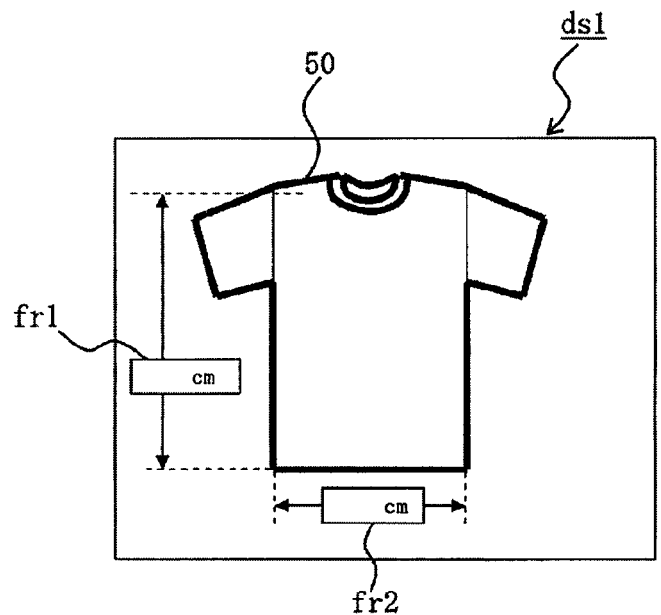
FIG. 4 is a view illustrating an example of a first screen formed in a display unit in the first embodiment of the invention.
Figure 5:
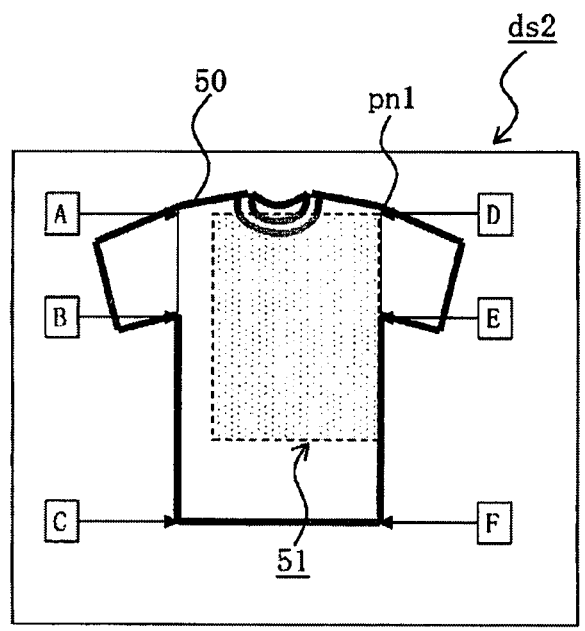
FIG. 5 is a first view illustrating an example of a second screen formed in the display unit in the first embodiment of the invention.
Figure 6:
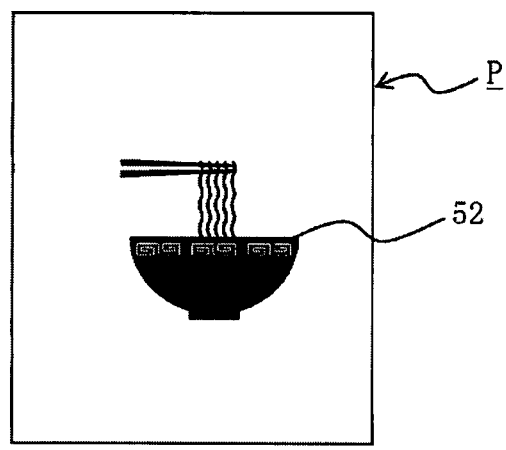
FIG. 6 is a view illustrating an example of a main image formed on a front side of an iron-on transfer paper in the first embodiment of the invention.
Figure 7:
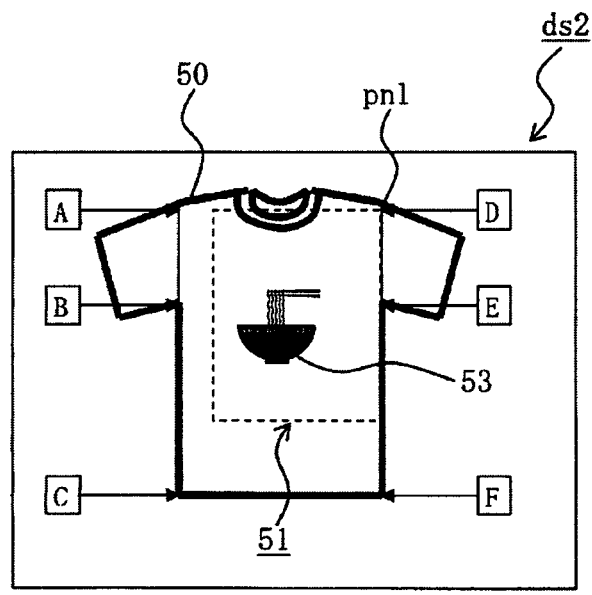
FIG. 7 is a second view illustrating the example of the second screen formed in the display unit in the first embodiment of the invention.
Figure 8:
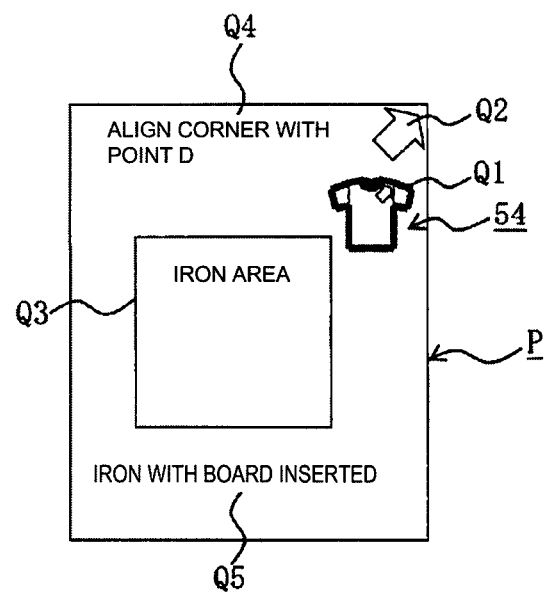
FIG. 8 is a view illustrating an example of a sub-image formed on a back side of the iron-on transfer paper in the first embodiment of the invention.
Figure 9:
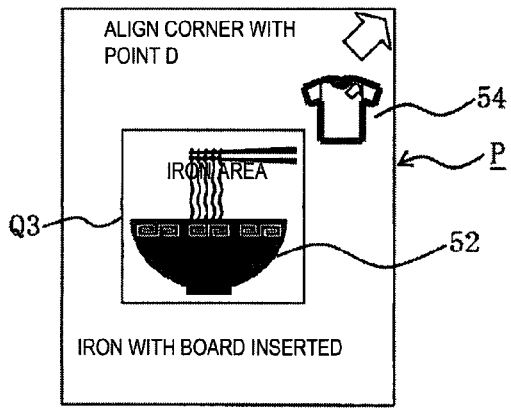
FIG. 9 is a see-through view of the iron-on transfer paper seen from the back side in the first embodiment of the invention.

FIG. 3 is a flowchart illustrating an operation of an application in the first embodiment of the invention. FIG. 4 is a view illustrating an example of a first screen formed in a display unit in the first embodiment of the invention. FIG. 5 is a first view illustrating an example of a second screen formed in the display unit in the first embodiment of the invention. FIG. 6 is a view illustrating an example of a main image formed on a front side of the iron-on transfer paper in the first embodiment of the invention. FIG. 7 is a second view illustrating the example of the second screen formed in the display unit in the first embodiment of the invention. FIG. 8 is a view illustrating an example of a sub-image formed on a back side of the iron-on transfer paper in the first embodiment of the invention; and FIG. 9 is a see-through view of the iron-on transfer paper seen from the back side in the first embodiment of the invention.

Firstly, in host computer 30, application 33 forms a first screen (size input screen) ds1 illustrated in FIG. 4 in display unit 31, and displays, on the first screen ds1, image 50 of a T-shirt onto which a main image formed on iron-on transfer paper is transferred. The application further forms input box fr1 as an input frame through which a vertical dimension of the T-shirt is inputted, and input box fr2 as an input frame through which a horizontal dimension of the T-shirt is inputted.

When an operator operates input unit 32 to input the size of the T-shirt, or in other words, when the vertical dimension and the horizontal dimension are respectively inputted into input boxes fr1 and fr2 (in centimeters, cm), and a paper size of the iron-on transfer paper is selected from a list formed by a pop-up operation or the like, application 33 forms second screen (medium positioning screen) ds2, as illustrated in FIG. 5, in display unit 31 and displays on display second screen ds2 image 50 of the T-shirt and image 51 of the iron-on transfer paper, of which the paper size has been selected.

Moreover, application 33 displays, on second screen ds2, parts of the T-shirt for positioning the iron-on transfer paper on the T-shirt, using the positions available for indicating the positioning parts, which in this embodiment are the right shoulder position A, right underarm position B, right hem position C, left shoulder position D, left underarm position E, and left hem position F.

The operator then operates input unit 32 to input any of the respective positions A to F with which a predetermined corner (in the embodiment, an upper-right corner of image 51) pn1 in image 51 of the iron-on transfer paper is aligned, thereby positioning the iron-on transfer paper. Here, a case is described where the operator aligns corner pn1 in image 51 of the iron-on transfer paper with the left shoulder position D.

Next, the operator operates input unit 32 to select main image 52 to be formed on the front side of iron-on transfer paper P (iron printing paper P) as illustrated in FIG. 6 from samples that are created in advance and recorded in a storage unit, which is not illustrated, of host computer 30.

The operator subsequently arranges an image to be formed on the T-shirt when the main image 52 is thermally transferred, or in other words, transfer image 53 is formed so as to be aligned with image 50 of the T-shirt displayed on second screen ds2, as illustrated in FIG. 7.

Application 33 then creates the data of transfer image 53 on image 51 of iron-on transfer paper P, and coverts left and right sides of the data, thereby creating a mirror-reversed image of transfer image 53, or in other words, creates print data indicating main image 52 to be formed on iron-on transfer paper P as illustrated in FIG. 6.

Next, application 33 creates print data indicating sub-image 54 to be formed on the back side of iron-on transfer paper P as illustrated in FIG. 8.

In the embodiment, sub-image 54 includes: reduced image Q1 of the T-shirt that is formed at a predetermined position on iron-on transfer paper P; arrow Q2 that indicates corner pn1 selected by the operator; iron area Q3 as a first position indication part that indicates a position of main image 52, in other words, an area in which an iron as a transfer device is used for transferring main image 52; message Q4 that is formed in the vicinity of arrow Q2 and prompts the operator to align corner pn1 with left shoulder position D; message Q5 that is formed in the vicinity of iron area Q3 and prompts the operator to use the iron by interposing a board with iron-on transfer paper P; and others. Reduced image Q1 described above is an image for showing a position of left shoulder position D in the T-shirt. In this case, in a see-through view of iron-on transfer paper P, main image 52 is formed on the front side in iron area Q3 of iron-on transfer paper P, as illustrated in FIG. 9.

Further, reduced image Q1 of the T-shirt, arrow Q2, messages Q4 and Q5, and others constitute guide information for positioning iron-on transfer paper P on the T-shirt.

Application 33 transmits print data indicating main image 52 and sub-image 54 to printer 10.

Next, the flowchart of FIG. 3 is described. At step S1, an operator inputs a size of a T-shirt. At step S2, the operator selects a paper size. At step S3, the operator does a positioning of iron-on transfer paper P. At step S4, the operator arranges transfer image 53. At step S5, application 33 creates print data indicating main image 52. At step S6, application 33 creates print data indicating sub-image 54. At step S7, application 33 transmits the print data to printer 10, and ends the processing.

Next, an operation of printer 10 is described.

Figure 10:
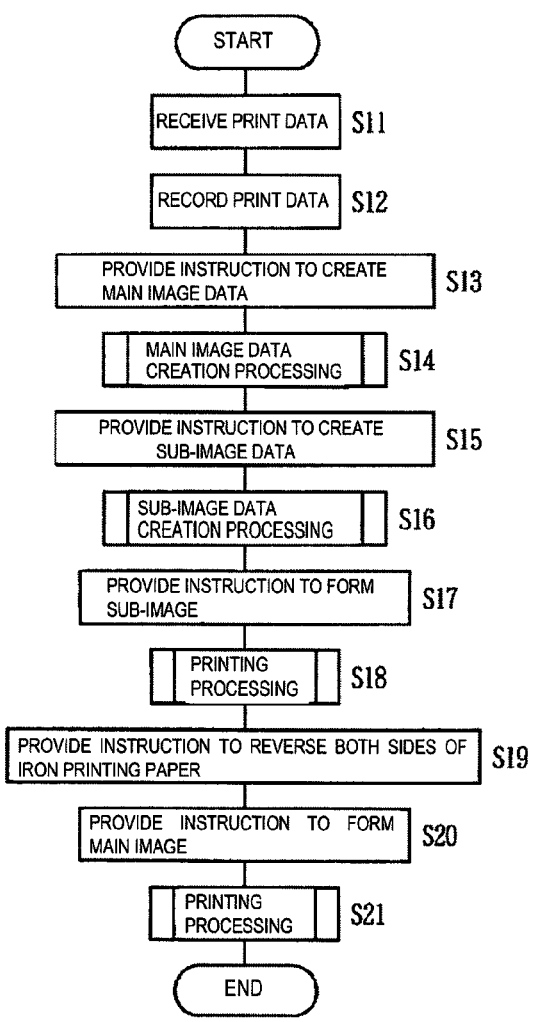
FIG. 10 is a flowchart illustrating an operation of the printer in the first embodiment of the invention.

FIG. 10 is a flowchart illustrating an operation of the printer in the first embodiment of the invention.

Firstly, when host computer 30 transmits print data, data reception unit 11 receives the print data in printer 10, records the print data in reception buffer 12, and when the recording of the print data is completed, the data reception unit notifies controller 13 that the recording of the print data is completed. When receiving the notification from data reception unit 11, controller 13 instructs data edit unit 14 to start editing of the print data.

When instructed by controller 13 to start editing the print data, data edit unit 14 reads out the print data from reception buffer 12, sends the print data to main image data creation unit 15, and instructs main image data creation unit 15 to create image data of main image 52, in other words, to create the main image data. When instructed by data edit unit 14 to create main image data, main image data creation unit 15 performs a main image data creation processing as the first image data creation processing to create main image data by editing the print data, and records the main image data in main image data storage unit 16.

Data edit unit 14 subsequently sends the print data to sub-image data creation unit 17, and instructs sub-image data creation unit 17 to create image data of sub-image 54, in other words, to create sub-image data. When being instructed to create sub-image data from data edit unit 14, sub-image data creation unit 17 performs a sub-image data creation processing as a second image data creation processing to create sub-image data by editing the print data, and records the sub-image data in sub-image data storage unit 18.

When the main image data and the sub-image data are respectively recorded in main image data storage unit 16 and sub-image data storage unit 18, data edit unit 14 notifies controller 13 that the main image data and the sub-image data are recorded.

Upon being notified that the main image data and the sub-image data are recorded, controller 13 instructs engine controller 19 to form sub-image 54.

When instructed to form sub-image 54, engine controller 19 performs a printing processing to read out the sub-image data from sub-image data storage unit 18, send the sub-image data to the LED heads in engine unit 20, and drive image formation unit 21 and fuser 22 in engine unit 20. Moreover, engine controller 19 instructs duplex printing controller 23 to reverse both sides of iron-on transfer paper P.

With this, in image formation unit 21 in engine unit 20, the charge rollers equally charge the front sides of the photosensitive drums of respective image formation units C, M, Y, and Bk, and the LED heads expose light thereto, thereby forming electrostatic latent images corresponding to the image data of sub-image 54. The toner on the development rollers is adhered onto the electrostatic latent images, thereby forming toner images.

Meanwhile, iron-on transfer paper P that is supplied from paper cassette 24 is conveyed through conveyance path 68. In the transfer units, the toner images of the cyan, magenta, yellow and black colors are transferred onto the back side of iron-on transfer paper P while being successively overlaid one on another, thereby forming a color toner image.

Iron-on transfer paper P is subsequently sent to fuser 22, and fuser 22 fixes the color toner image, thereby forming sub-image 54 on the back side of iron-on transfer paper P.

Next, iron-on transfer paper P is sent to conveyance paths 69 and 70. Iron-on transfer paper P, of which both sides have been reversed in conveyance paths 69 and 70, is sent to reverse paper stack 25 via conveyance path 71, and is temporarily housed in reverse paper stack 25.

Controller 13 subsequently instructs engine controller 19 to form main image 52.

When instructed to form main image 52, engine controller 19 performs the printing processing to read out the main image data from main image data storage unit 16, send the main image data to the LED heads in engine unit 20, and drive image formation unit 21 and fuser 22 in engine unit 20. Moreover, engine controller 19 instructs duplex printing controller 23 to cancel the instruction to reverse both sides of iron-on transfer paper P.

With this, in image formation unit 21 in engine unit 20, the charge rollers equally charge the front sides of the photosensitive drums of the respective image formation units of C, M, Y, and Bk, the LED heads expose light thereto, thereby forming electrostatic latent images corresponding to the image data of main image 52. The toner on the development rollers is adhered onto the electrostatic latent images, thereby forming toner images.

Meanwhile, iron-on transfer paper P is supplied from reverse paper stack 25 via conveyance path 72, and is conveyed through conveyance path 68. In the transfer units, the toner images of the cyan, magenta, yellow, black and white colors are transferred onto the front side of iron-on transfer paper P while being successively overlaid one on another, thereby forming a white toner coated image.

Iron-on transfer paper P is subsequently sent to fuser 22, and fuser 22 fixes the white toner coated image, thereby forming main image 52 on the front side of iron-on transfer paper P.

In this manner, iron-on transfer paper P with main image 52 and sub-image 54 respectively formed on the front side and on the back side is discharged to the outside of the apparatus main body via conveyance path 73.

Next, the flowchart of FIG. 10 is described. At step S11, data reception unit 11 receives print data. At step S12, data reception unit 11 records the print data in reception buffer 12. At step S13, data edit unit 14 instructs main image data creation unit 15 to create main image data. At step S14, main image data creation unit 15 performs main image data creation processing. At step S15, data edit unit 14 instructs sub-image data creation unit 17 to create sub-image data. At step S16, sub-image data creation unit 17 performs the sub-image creation processing. At step S17, controller 13 instructs engine controller 19 to form sub-image 54. At step S18, engine controller 19 performs the printing processing. At step S19, engine controller 19 instructs duplex printing controller 23 to reverse both sides of iron-on transfer paper P. At step S20, controller 13 instructs engine controller 19 to form main image 52. At step S21, engine controller 19 performs the printing processing, and ends the processing.

When main image 52 and sub-image 54 are respectively formed on the front side and on the back side of iron-on transfer paper P in this manner, an operator places iron-on transfer paper P on a T-shirt such that the back side is opposed to the T-shirt in accordance with a work procedure illustrated in sub-image 54, and performs an ironing work. This allows main image 52 to be thermally transferred onto a predetermined position of the T-shirt.

Figure 11:
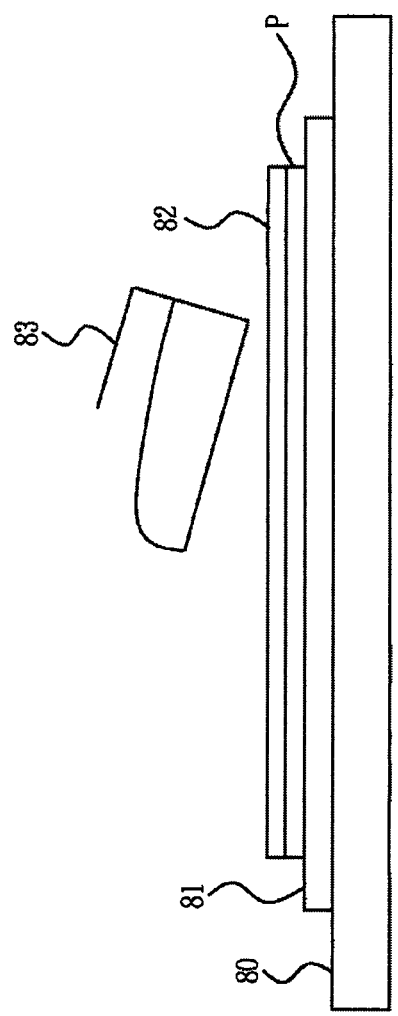
FIG. 11 is a view for explaining a method of thermal transfer of the main image in the first embodiment of the invention.

FIG. 11 is a view for explaining a method of thermal transferring the main image in the first embodiment of the invention.

In FIG. 11, 80 denotes a board for performing an ironing work, 81 denotes a T-shirt that is placed on board 80, P denotes iron-on transfer paper that is placed on T-shirt 81 at a front side thereof, 82 denotes a board that is placed on iron-on transfer paper P, and 83 denotes an iron.

Iron-on transfer paper P is placed on T-shirt 81 such that corner pn1 (FIG. 5) is aligned with left shoulder position D.

Moreover, board 82 prevents sub-image 54 that is formed on the back side of iron-on transfer paper P from being fused due to heat from iron 83 and transferred onto the bottom surface of iron 83 when main image 52 (FIG. 6) is thermally transferred onto T-shirt 81. Board 82 is made of a material that is high heat-resistant so as not to deform and deteriorate due to a reception of the heat by iron 83. Board 82 is transparent so as to allow the operator to see the content of sub-image 54 when the operator uses iron 83.

It should be noted that iron-on transfer paper P has a high peel property of toner at the front side so as to allow main image 52 to be easily thermally transferred onto T-shirt 8, and iron-on transfer paper P has a low peel property of toner at the back side so as to prevent sub-image 54 from being peeled from iron-on transfer paper P, when iron 83 is used.

Accordingly, in the embodiment, main image 52 is formed on the front side of iron-on transfer paper P on the basis of the image data of main image 52, and sub-image 54 is formed on the back side of iron-on transfer paper P on the basis of the image data of sub-image 54 in which iron area Q3 that indicates a position of main image 52 is formed. Therefore, when placing iron-on transfer paper P on T-shirt 81 to thermally transfer main image 52 onto T-shirt 81, the operator can know which position and direction to place iron-on transfer paper P on T-shirt 81.

Consequently, main image 52 can be transferred onto T-shirt 81 with a high degree of accuracy, so that the image can be adequately formed on T-shirt 81.

Next, a second embodiment according to the invention is described. It should be noted that the same reference numerals are assigned to the portions having the same structure as the first embodiment, and the effect in the first embodiment is used for an effect of the invention exhibited by the same structure.

Figure 12:
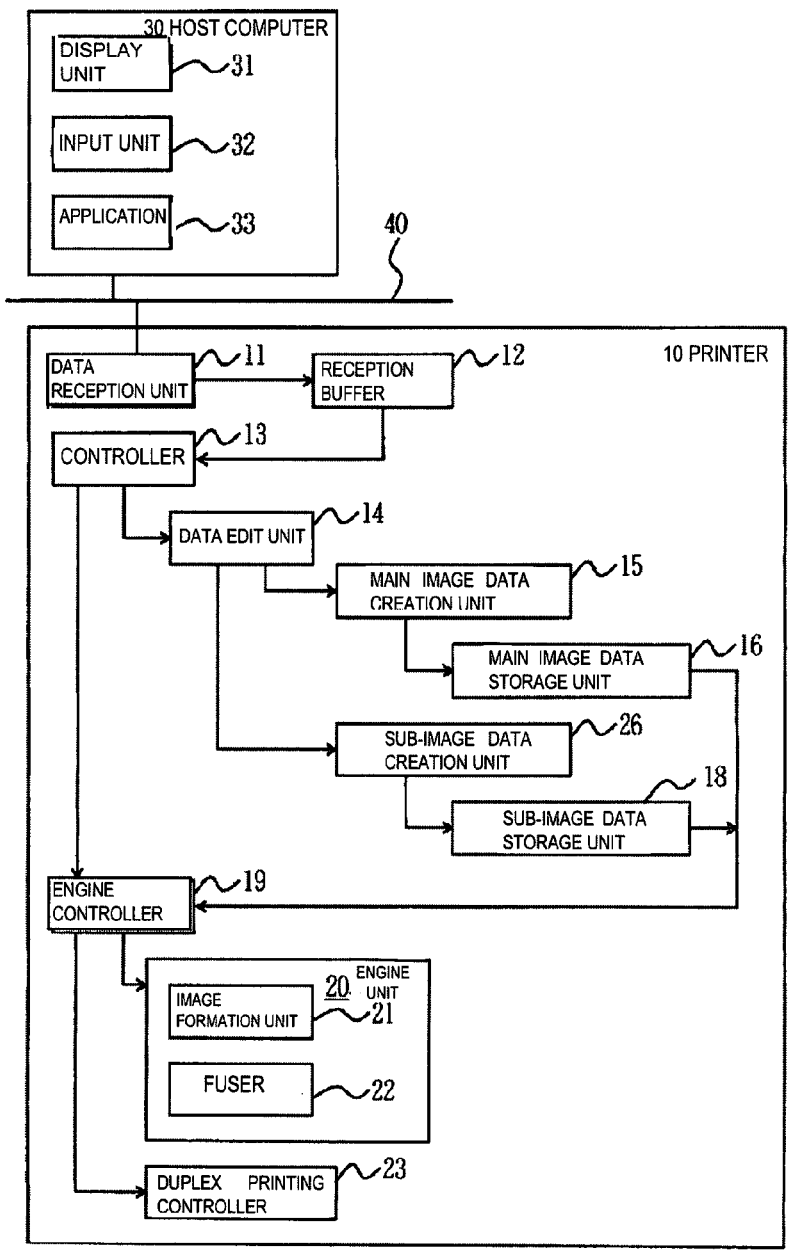
FIG. 12 is a control block diagram of a printing system according to a second embodiment of the invention.
Figure 13:
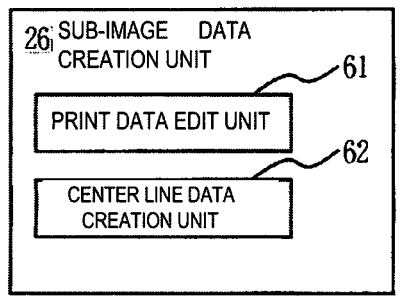
FIG. 13 is a control block diagram of a second image data creation unit in the second embodiment of the invention second.

FIG. 12 is a control block diagram of a printing system in the second embodiment of the invention, and FIG. 13 is a control block diagram of a sub-image data creation unit in the second embodiment of the invention.

In FIGS. 12 and 13, 26 denotes a sub-image data creation unit as a second image data creation unit. Sub-image data creation unit 26 is provided with print data edit unit 61 that edits print data, and center line data creation unit 62 as a position indication data creation unit. Center line data creation unit 62 creates center line data for forming center lines Q11 in sub-image 54 (FIG. 17), which is described later.

Next, an operation of host computer 30 is described.

Figure 14:
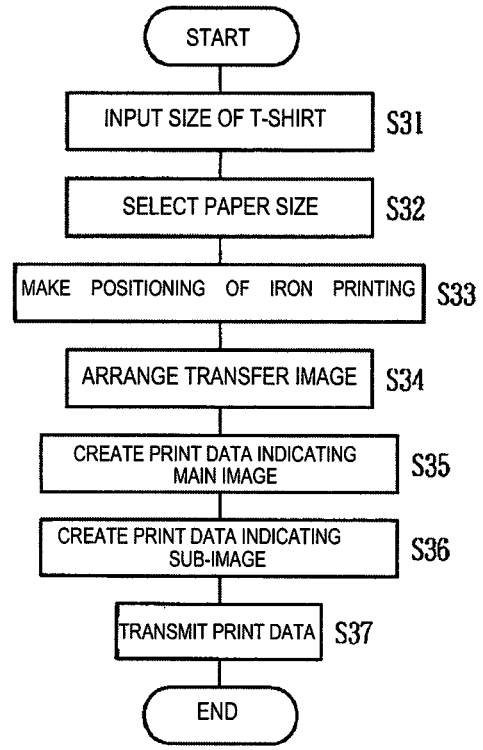
FIG. 14 is a flowchart illustrating an operation of an application in the second embodiment of the invention.

FIG. 14 is a flowchart illustrating an operation of an application in the second embodiment of the invention.

Firstly, in host computer 30 as a higher-level apparatus, application 33 as a higher-level controller forms a first screen (size input screen) ds1, illustrated in FIG. 4, in display unit 31, and displays, on the first screen ds1, image 50 of a T-shirt as a second medium onto which a main image formed on iron-on transfer paper as a first medium and as a transfer medium is transferred. Application 33 further forms input box fr1 as an input frame through which a vertical dimension of the T-shirt is inputted, and input box fr2 as an input frame through which a horizontal dimension of the T-shirt is inputted.

When an operator operates input unit 32 to input the size of the T-shirt, or in other words, when the operator inputs the vertical dimension and the horizontal dimension in input boxes fr1 and fr2, respectively, and selects a paper size of the iron-on transfer paper in a list formed by a pop-up operation or the like, application 33 forms second screen (medium positioning screen) ds2, as illustrated in FIG. 5 in display unit 31, and displays on display second screen ds2 image 50 of the T-shirt, and image 51 of the iron-on transfer paper of which the paper size is selected.

Moreover, application 33 displays, on second screen ds2, parts of the T-shirt for positioning the iron-on transfer paper on the T-shirt, or in other words, positions indicating the positioning parts, which in this embodiment are right shoulder position A, right underarm position B, right hem position C, left shoulder position D, left underarm position E, and left hem position F.

The operator then operates input unit 32 to input any of the respective positions A to F with which predetermined corner (in the embodiment, an upper-right corner of image 51) pn1 in image 51 of the iron-on transfer paper is aligned, thereby positioning the iron-on transfer paper. Here, a case is described where the operator aligns corner pn1 in image 51 of the iron-on transfer paper with left shoulder position D.

Next, the operator operates input unit 32 to select main image 52 to be formed on the front side of iron-on transfer paper P, as illustrated in FIG. 6, from samples that are created in advance and recorded in a storage unit, which is not illustrated, of host computer 30.

The operator subsequently arranges an image to be formed on the T-shirt when the main image 52 is transferred, in the embodiment, when thermally transferred. In other words, transfer image 53 is formed so as to be aligned with image 50 of the T-shirt displayed on second screen ds2, as illustrated in FIG. 7.

Application 33 then creates the data of transfer image 53 on image 51 of iron-on transfer paper P, and coverts left and right sides of the data, thereby creating a mirror-reversed image of transfer image 53; in other words, thereby creating print data indicating main image 52 to be formed on iron-on transfer paper P as illustrated in FIG. 6.

Next, application 33 creates print data indicating sub-image 54 to be formed on the back side of iron-on transfer paper P as illustrated in FIG. 8.

In the embodiment, sub-image 54 includes: reduced image Q1 of the T-shirt that is formed at a predetermined position on iron-on transfer paper P; arrow Q2 that indicates corner pn1 selected by the operator; iron area Q3 as a first position indication part that indicates a position of main image 52, in other words, an area in which an iron as a transfer device is to be used for transferring main image 52; message Q4 that is formed in the vicinity of arrow Q2 and prompts the operator to align corner pn1 with left shoulder position D; message Q5 that is formed in the vicinity of iron area Q3 and prompts the operator to use the iron with a board interposed between the iron and iron-on transfer paper P; and the like. Reduced image Q1 described above is an image for showing the left shoulder position D in the T-shirt. In this case, in a see-through view of iron-on transfer paper P, main image 52 is formed on the front side of iron-on transfer paper P in iron area Q3, as illustrated in FIG. 9.

Application 33 then transmits print data indicating main image 52 and sub-image 54 to printer 10.

Next, the flowchart of FIG. 14 is described. At step S31, an operator inputs a size of a T-shirt. At step S32, the operator selects a paper size. At step S33, the operator positions, or makes a positioning of, iron-on transfer paper P. At step S34, the operator arranges transfer image 53. At step S35, application 33 creates print data indicating main image 52. At step S36, application 33 creates print data indicating sub-image 54. At step S37, application 33 transmits the print data to printer 10, and ends the processing.

Meanwhile, in some cases, before placing iron-on transfer paper P on T-shirt 81 and performing an ironing work, an operator may erroneously cut iron-on transfer paper P in such a manner as to leave only a portion where main image 52 is formed on the front side by cutting off its surrounding portion from iron-on transfer paper P. In that case, since the operator becomes unable to see reduced image Q1 of the T-shirt, arrow Q2, iron area Q3, messages Q4 and Q5, and others on the back side of iron-on transfer paper P, and also loses the corner portion of the iron-on transfer paper P on which arrow Q2 is formed, the operator cannot make a positioning of iron-on transfer paper P on the T-shirt.

To address this, in the embodiment, sub-image data creation unit 26 forms center lines in iron area Q3 in order to make the positioning of iron-on transfer paper P on T-shirt 81.

Next, an operation of printer 10 is described.

Figure 15:
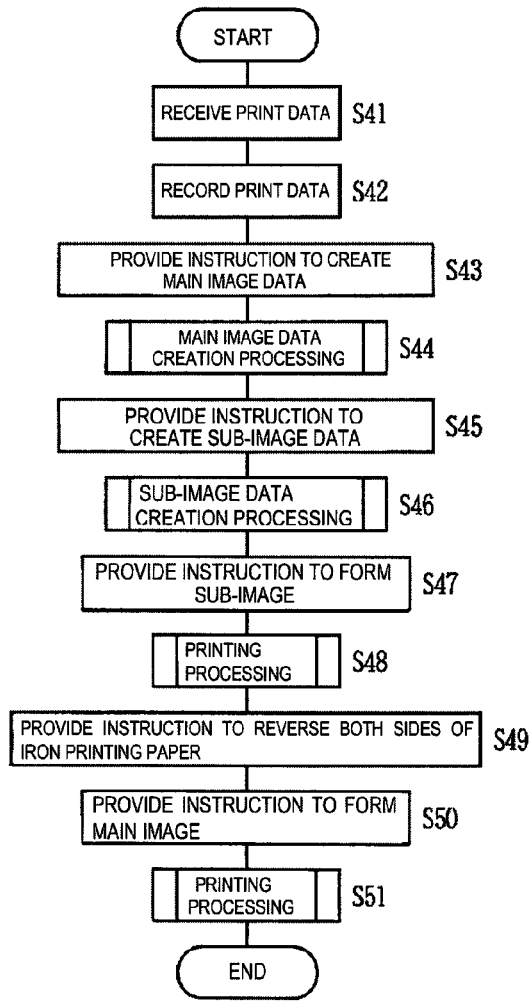
FIG. 15 is a flowchart illustrating an operation of a printer in the second embodiment of the invention.
Figure 16:
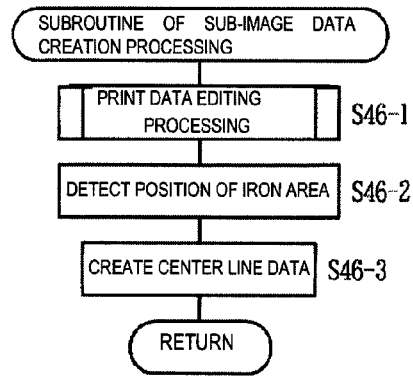
FIG. 16 is a flowchart illustrating a subroutine of the sub-image data creation processing in the second embodiment of the invention.
Figure 17:
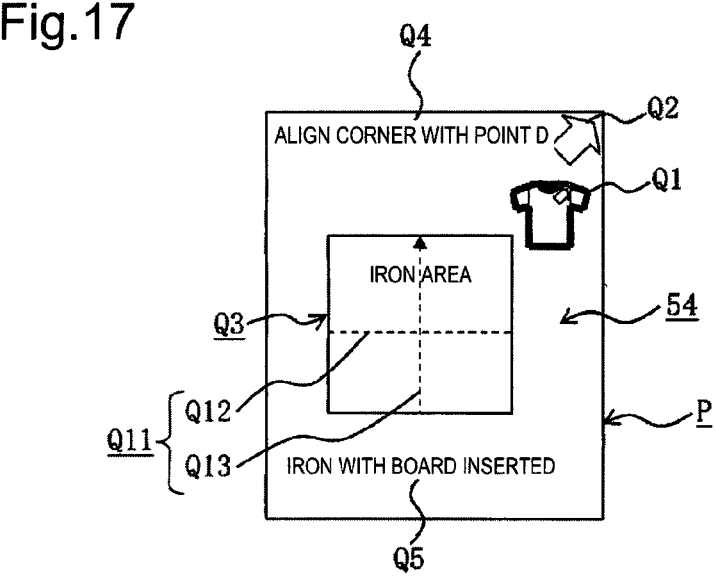
FIG. 17 is a view illustrating an example of a sub-image formed on the back side of the iron-on transfer paper in the second embodiment of the invention.
Figure 18:
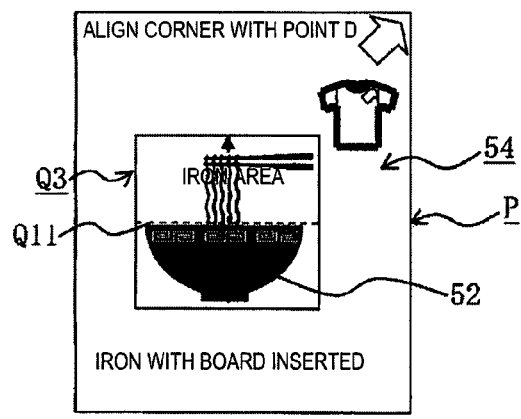
FIG. 18 is a see-through view of the iron-on transfer paper seen from the back side in the second embodiment of the invention.
Figure 19:
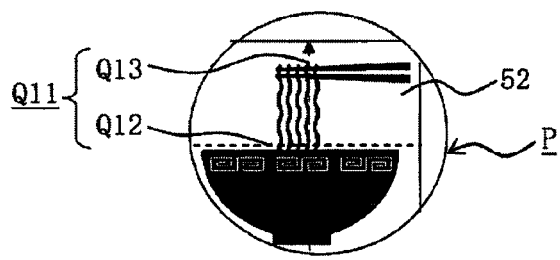
FIG. 19 is a see-through view illustrating an example of the iron-on transfer paper in which a surrounding portion of a portion where a main image is formed is cut off in the second embodiment of the invention.
Figure 20:
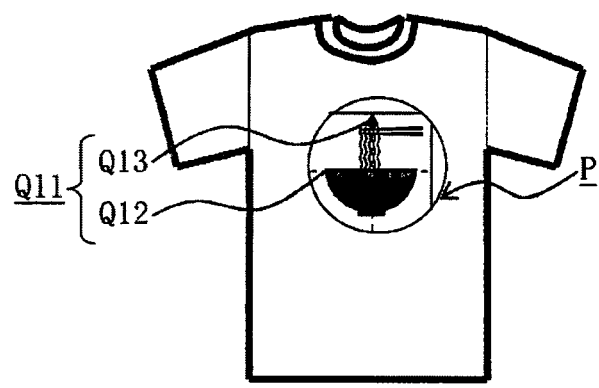
FIG. 20 is a see-through view illustrating a state where the iron-on transfer paper, with the surrounding portion of the portion where the main image is formed being cut off, is placed on a T-shirt in the second embodiment of the invention.

FIG. 15 is a flowchart illustrating an operation of a printer in the second embodiment of the invention. FIG. 16 is a flowchart illustrating a subroutine of sub-image data creation processing in the second embodiment of the invention. FIG. 17 is a view illustrating an example of a sub-image formed on the back side of iron-on transfer paper in the second embodiment of the invention. FIG. 18 is a see-through view of the iron-on transfer paper seen from the back side in the second embodiment of the invention. FIG. 19 is a see-through view illustrating an example of the iron-on transfer paper in which a surrounding portion, of a portion where a main image is formed, is cut off in the second embodiment of the invention. FIG. 20 is a see-through view illustrating a state where the iron-on transfer paper with the surrounding portion of the portion where the main image is formed being cut off is placed on a T-shirt in the second embodiment of the invention.

Firstly, when host computer 30 transmits print data, data reception unit 11 in printer 10 receives the print data and records the print data in reception buffer 12. When the recording of the print data is completed, the reception unit notifies controller 13 that the recording of the print data is completed. When receiving the notification from data reception unit 11, controller 13 instructs data edit unit 14 to start editing the print data.

When instructed to start editing the print data from controller 13, data edit unit 14 reads out the print data from reception buffer 12, sends the print data to main image data creation unit 15 as a first image data creation unit, and instructs main image data creation unit 15 to create a main image data. When instructed to create the main image data from data edit unit 14, main image data creation unit 15 creates the main image data by editing the print data, and records the main image data in main image data storage unit 16 as a first image data storage unit.

Data edit unit 14 subsequently sends the print data to sub-image data creation unit 17, and instructs sub-image data creation unit 26 to create the sub-image data. When instructed to create the sub-image data from data edit unit 14, sub-image data creation unit 26 creates sub-image data, and records the sub-image data in sub-image data storage unit 18 as a second image data storage unit.

For this, print data edit unit 61 performs print data editing processing to edit the print data. Center line data creation unit 62 detects a position of iron area Q3 on the basis of the print data, and creates the center line data such that center lines Q11 are formed as a second position indication part that indicates the position of main image 52.

In this case, as illustrated in FIG. 17, the center line data is created such that center lines Q11 include line (dashed line) Q12 that passes through the center of iron area Q3 and extends in the width direction of iron-on transfer paper P, and arrow line (dashed line) Q13 that passes through the center of iron area Q3 and extends in the longitudinal direction of iron-on transfer paper P. The center of center lines Q11 is an intersection point between lines Q12 and Q13 and is positioned at the center of iron area Q3.

Consequently, in a see-through view of iron-on transfer paper P, main image 52 is formed on the front side in iron area Q3 of iron-on transfer paper P, as illustrated in FIG. 18. Moreover, center lines Q11 are formed by being overlaid on main image 52.

In the embodiment, center line data creation unit 62 is configured to detect a position of iron area Q3 on the basis of the print data, and create center line data such that the intersection point between lines Q12 and Q13 is positioned at the center of iron area Q3. Alternatively, center line data creation unit 62 can be configured to detect a position of main image 52 on the basis of the print data, and create center line data such that the intersection point between lines Q12 and Q13 is positioned at the center of main image 52.

When the main image data and the sub-image data are respectively recorded in main image data storage unit 16 and sub-image data storage unit 18, data edit unit 14 notifies controller 13 that the main image data and the sub-image data are recorded.

When notified that the main image data and the sub-image data are recorded, controller 13 instructs engine controller 19 to form sub-image 54.

When instructed to form sub-image 54, engine controller 19 reads out the sub-image data from sub-image data storage unit 18, sends the sub-image data to the LED heads, as exposure devices in engine unit 20, and drives image formation unit 21 and fuser 22 as a fixation device in engine unit 20. Moreover, engine controller 19 instructs duplex printing controller 23 to reverse both sides of iron-on transfer paper P.

With this, in image formation unit 21 in engine unit 20, toner images as developer images are formed on the respective photosensitive drums as the image carriers of image formation units C, M, Y, and Bk. Iron-on transfer paper P that is supplied from paper cassette 24 as a first medium holder is conveyed through conveyance path 68. In the transfer units, the toner images of the cyan, magenta, yellow and black colors are transferred onto the back side of iron-on transfer paper P while being successively overlaid one on another, thereby forming a color toner image.

Iron-on transfer paper P is subsequently sent to fuser 22, and sub-image 54 is formed on the back side of iron-on transfer paper P in fuser 22.

Iron-on transfer paper P is then sent to conveyance paths 69 and 70. Iron-on transfer paper P of which both sides have been reversed in conveyance paths 69 and 70 is sent to reverse paper stack 25 as a second medium holder via conveyance path 71, and is temporarily housed in reverse paper stack 25.

Controller 13 subsequently instructs engine controller 19 to form main image 52.

When being instructed to form main image 52, engine controller 19 reads out main image data from main image data storage unit 16, sends the main image data to the LED heads in engine unit 20, and drives image formation unit 21 and fuser 22 in engine unit 20. Moreover, engine controller 19 instructs duplex printing controller 23 to cancel the instruction to reverse both sides of iron-on transfer paper P.

With this, in image formation unit 21 of engine unit 20, toner images as developer images are formed on the respective photosensitive drums as the image carriers of image formation units C, M, Y, and Bk. Iron-on transfer paper P that is supplied from reverse paper stack 25 via conveyance path 72 is conveyed through conveyance path 68. In the transfer units, the toner images of the cyan, magenta, yellow, black and white colors are transferred onto the front side of iron-on transfer paper P while being successively overlaid one on another, thereby forming a white toner coated image.

Iron-on transfer paper P is subsequently sent to fuser 22, and fuser 22 fixes the white toner coated image, thereby forming main image 52 on the front side of iron-on transfer paper P.

In this manner, iron-on transfer paper P with main image 52 and sub-image 54 respectively formed on the front side and on the back side is discharged to the outside of the apparatus main body via conveyance path 73.

In the embodiment, center lines Q11 of iron area Q3 are formed in sub-image 54 in this manner. Accordingly, as illustrated in FIG. 19, if an operator erroneously cuts off the surrounding portion of a portion where main image 52 is formed on the front side of iron-on transfer paper P, the operator can check the center position in the horizontal direction of main image 52 formed on the front side of iron-on transfer paper P on the basis of line Q12, and can check the center position in the vertical direction of main image 52 formed on the front side of iron-on transfer paper P on the basis of line Q13, and can check if the main image 52 be oriented in the upward direction on the basis of line Q13. Moreover, the operator can determine the front side or the back side of iron-on transfer paper P on the basis of at least one of lines Q12 and 13.

Consequently, the operator can establish a position of iron-on transfer paper P on the T-shirt through a positioning process on the basis of the positions of lines Q12 and Q13 on sub-image 54. This allows main image 52 to be transferred onto T-shirt 81 with high accuracy, and with the image able to be adequately formed on T-shirt 81.

Next, the flowchart of FIG. 15 illustrating the operation of the printer in the second embodiment is described. At step S41, data reception unit 11 receives print data. At step S42, data reception unit 11 records the print data in reception buffer 12. At step S43, data edit unit 14 instructs main image data creation unit 15 to create main image data. At step S44, main image data creation unit 15 performs main image data creation processing. At step S45, data edit unit 14 instructs sub-image data creation unit 17 to create sub-image data. At step S46, sub-image data creation unit 17 performs a sub-image creation processing. At step S47, controller 13 instructs engine controller 19 to form sub-image 54. At step S48, engine controller 19 performs the printing processing. At step S49, engine controller 19 instructs duplex printing controller 23 to reverse both sides of iron-on transfer paper P. At step S50, controller 13 instructs engine controller 19 to form main image 52. At step S51, engine controller 19 performs the printing processing, and ends the processing.

Next, the flowchart of FIG. 16 illustrating the subroutine of the sub-image data creation processing of the second embodiment is described. At step S46-1, print data edit unit 61 performs print data editing processing. At step S46-2, center line data creation unit 62 detects a position of iron area Q3. At step S46-3, center line data creation unit 62 creates center line data, and then the subroutine of the sub-image data creation processing ends.

In the embodiment, center line data creation unit 62 in printer 10 is configured to create data of center lines Q11 on the basis of the print data. Alternatively, application 33 in host computer 30 can create sub-image data such that the center lines of iron area Q3 are formed. In that case, in printer 10, on the basis of the print data transmitted from host computer 30, center lines Q11 of iron area Q3 are formed on sub-image 54 at the back of iron-on transfer paper P.

Moreover, in the embodiment, at the back side of iron-on transfer paper P, as an alternative to center lines Q11, a mirror-reversed image of main image 52, in other words, the reversed image corresponding to main image 52, can be formed as a positioning mark. In that case, processing such as toner saving is performed when the reversed image is formed for a reduced use in the amount of toner as the developers.

It should be noted that the invention is not limited to the abovementioned respective embodiments. Various modifications are possible based on the spirit of the invention, and are not excluded from the scope of the invention.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus for forming an image on a first side and a second side of a first medium, the image formation apparatus comprising:
    a first image data creation unit configured to create image data of a main image to be formed on the first side of the first medium;
    a second image data creation unit configured to create image data of a sub-image to be formed on the second side of the first medium; and
    an engine unit configured to form the main image on the first side of the first medium on the basis of the image data of the main image, and the sub-image on the second side of the first medium on the basis of the image data of the sub-image, wherein the sub-image includes a position indication part that indicates a position of the main image on the first side of the first medium,
    wherein the main image includes:
    a first image having a plurality of color developers; and
    a second image having a predetermined color developer that is operative as a coating layer that covers the first image when provided on the first medium and that is operative as a backing layer of the first image when transferred on a second medium different from the first medium,
    wherein the sub-image further includes a reduced image of the second medium with an arrow pointing to a particular location on the second medium.

2. The image formation apparatus according to claim 1, wherein the main image is peelable from the first medium to be transferred onto the second medium.

3. The image formation apparatus according to claim 1, wherein the sub-image includes guide information for positioning the first medium on the second medium.

4. The image formation apparatus according to claim 1, wherein the position indication part indicates the position of the main image as an area.

5. The image formation apparatus according to claim 1, wherein the position indication part indicates the position of the main image as a center position of the main image.

6. The image formation apparatus according to claim 1, wherein the position indication part indicates the position of the main image as an image corresponding to the main image.

7. The image formation apparatus according to claim 1, wherein a peel property, from the first medium, of the image on the first side of the first medium is set higher than a peel property, from the first medium, of the image on the second side.

8. The image formation apparatus according to claim 1, wherein the main image is formed by coating a coating agent on a developer image.

9. The image formation apparatus according to claim 1, wherein the engine unit forms the main image on the first side of the first medium after having formed the sub-image on the second side of the first medium.

10. The image formation apparatus according to claim 1, wherein
the first medium is iron-on transfer paper.

11. The image formation apparatus according to claim 10, wherein
the second medium is cloth.

12. The image formation apparatus according to claim 1, wherein the predetermined color developer is a white color developer.

13. The image formation apparatus according to claim 1, wherein the predetermined color developer is formed only on the first side of the first medium on which the main image is to be formed.

14. The image formation apparatus according to claim 1, wherein the sub-image includes a mirror image of the first image of the main image.

15. An image formation apparatus for forming an image on a first side and a second side of a first medium, the image formation apparatus comprising:
a first image data creation unit configured to create image data of a main image to be formed on the first side of the first medium:
a second image data creation unit configured to create image data of a sub-image to be formed on the second side of the first medium; and
an engine unit configured to form the main image on the first side of the first medium on the basis of the image data of the main image, and the sub-image on the second side of the first medium on the basis of the image data of the sub-image, wherein the sub-image includes a position indication part that indicates a position of the main image on the first side of the first medium,
wherein the main image includes:
a first image having a plurality of color developers; and
a second image having a predetermined color developer that is operative as a coating layer that covers the first image when provided on the first medium and that is operative as a backing layer of the first image when transferred on a second medium different from the first medium,
wherein the position indication part comprises a first line and a second line perpendicular to the first line, wherein an intersection of the first line and the second line corresponds to a substantially center point of the main image disposed on the first side of the first medium.

16. An image formation apparatus for forming an image on a first side and a second side of a first medium, the image formation apparatus comprising:
a first image data creation unit configured to create image data of a main image to be formed on the first side of the first medium;
a second image data creation unit configured to create image data of a sub-image to be formed on the second side of the first medium; and
a print unit configured to print the main image on the first side of the first medium on the basis of the image data of the main image, and the sub-image on the second side of the first medium on the basis of the image data of the sub-image,
wherein the main mage includes:
a first image having a plurality of color developers; and
a second image having a predetermined color developer that is operative as a coating layer that covers the first image when provided on the first medium and that is operative as a backing layer of the first image when transferred on a second medium different from the first medium, and
the sub-image includes a mirror image of the first image of the main image,
wherein the sub-image further includes a reduced image of the second medium with an arrow pointing to a particular location on the second medium.

17. The image formation apparatus according to claim 16, wherein the predetermined color developer is a white color developer.

18. The image formation apparatus according to claim 16, wherein the predetermined color developer is formed only on one side of the first medium on which the main image is to be formed.

* * * * *